US009890525B2

(12) United States Patent
Magar

(10) Patent No.: US 9,890,525 B2
(45) Date of Patent: Feb. 13, 2018

(54) DEVICE FOR CONTROLLING THE FILLING OF A CISTERN

(71) Applicants: ETABLISSEMENTS DUBOURGEL GRANGE, Fontaine (FR); Hubert Magar, Schwerdorff (FR)

(72) Inventor: Hubert Magar, Schwerdorff (FR)

(73) Assignee: Etablissements Dubourgel Grange, Fontaine (FR)

( * ) Notice: Subject to any disclaimer, the term of this patent is extended or adjusted under 35 U.S.C. 154(b) by 153 days.

(21) Appl. No.: 14/392,313

(22) PCT Filed: Jun. 24, 2014

(86) PCT No.: PCT/FR2014/051572
§ 371 (c)(1),
(2) Date: Dec. 23, 2015

(87) PCT Pub. No.: WO2014/207365
PCT Pub. Date: Dec. 31, 2014

(65) Prior Publication Data
US 2016/0168834 A1    Jun. 16, 2016

(30) Foreign Application Priority Data

Jun. 27, 2013    (FR) ...................................... 13 56196

(51) Int. Cl.
*E03D 1/33*        (2006.01)
*F16K 31/24*       (2006.01)
(Continued)

(52) U.S. Cl.
CPC ................. *E03D 1/33* (2013.01); *E03D 1/32* (2013.01); *E03D 1/36* (2013.01); *F16K 31/24* (2013.01);
(Continued)

(58) Field of Classification Search
CPC .. E03D 1/06; E03D 1/12; E03D 1/125; E03D 1/165; E03D 1/32; E03D 1/33;
(Continued)

(56) References Cited

U.S. PATENT DOCUMENTS 258,433 A * 5/1882 Keith ...................... E03D 5/012
                                                    137/428
414,397 A * 11/1889 Goetz ...................... C21C 7/10
                                                    137/130
(Continued)

FOREIGN PATENT DOCUMENTS

FR    2 942 816 A1    9/2010
WO    94 09217 A1    4/1994
WO    99 20850 A1    4/1998

*Primary Examiner* — Mary McManmon
*Assistant Examiner* — Richard K Durden
(74) *Attorney, Agent, or Firm* — Andrew W. Chu; Craft Chu PLLC

(57) ABSTRACT

A device for controlling the filling of a cistern in a main reservoir of a toilet flushing system includes a water inlet controlled by a valve. The closing of the valve is controlled by a float that is movable from a high position to a low position. The float is contained in a float housing in the high position. The float housing connects to the main reservoir by at least one siphon having two tubes: a suction tube linked to the float housing; and a discharge tube being linked to the main reservoir and opening into an auxiliary reservoir. There is a control mechanism provided with a mechanism for priming the siphon, wherein shifts between an initial position and an actuated position of the control mechanism result in overpressure or underpressure at the siphon so as to control draining of the float housing.

9 Claims, 2 Drawing Sheets

(51) Int. Cl.
*E03D 1/32* (2006.01)
*E03D 1/36* (2006.01)
*E03D 1/12* (2006.01)

(52) U.S. Cl.
CPC ........... *E03D 1/125* (2013.01); *Y10T 137/272* (2015.04); *Y10T 137/2849* (2015.04); *Y10T 137/2856* (2015.04); *Y10T 137/2877* (2015.04); *Y10T 137/2883* (2015.04); *Y10T 137/2897* (2015.04)

(58) Field of Classification Search
CPC . E03D 1/36; F16K 31/20; F16K 31/24; F16K 31/34; Y10T 137/272; Y10T 137/2747; Y10T 137/2768; Y10T 137/2795; Y10T 137/2802; Y10T 137/2849; Y10T 137/2856; Y10T 137/2877; Y10T 137/2883; Y10T 137/2897; Y10T 137/3062; Y10T 137/742; Y10T 137/7423; Y10T 137/7439; Y10T 137/7462
USPC .... 4/366, 368, 369, 373, 382; 137/124, 128, 137/130, 135, 136, 143, 144, 147, 148, 137/150, 190, 428, 429, 434, 441
See application file for complete search history.

(56) References Cited

U.S. PATENT DOCUMENTS

| | | | | |
|---|---|---|---|---|
| 840,613 | A | * | 1/1907 | Findeisen ................. E03D 1/22 137/428 |
| 1,150,673 | A | * | 8/1915 | Greth ...................... F04F 10/00 122/401 |
| 4,471,798 | A | * | 9/1984 | Johannesen ............... E03D 1/33 137/135 |
| 5,742,951 | A | | 4/1998 | Wright |

* cited by examiner

DEVICE FOR CONTROLLING THE FILLING OF A CISTERN

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a device for controlling the filling of a cistern of a toilet flushing system. The device for controlling is in a main reservoir of the toilet flushing system.

2. Description of Related Art Including Information Disclosed Under 37 CFR 1.97 and 37 CFR 1.98

In a previous patent application (U.S. Ser. No. 13/581,731, issued as U.S. Pat. No. 9,464,420) by the same Applicant, relating to a valve actuated by a float in a float housing, the drop of the water level and, consequently, the float, can only be obtained by causing water to pass over one of the side walls of the float housing. In order to reset the float to drop, the control button must be released, which provides the device with a positive safety. The resetting occurs by locating a bell under the float so that pressing and releasing the control button causes a pressure on a bellows or a small pump to discharge a volume of water. The volume of water releases the water in the float housing so that the level of water drops again in the float housing, causing the descent of the float and simultaneously triggering the opening of the valve.

However, these devices require large volumes in order to arrange the various fairly large parts. Indeed, it is necessary to take into consideration the wear that will occur after aging and due to scale deposits in the long run. No risk should be taken, and all of the float mass or water in the float housing should preferably be released during the resetting. The size of the control components must therefore be particularly large. Thus, there is an alternate solution of resetting by siphoning, which significantly reduces the dimensions of the necessary control components, and the effort necessary to control the devices. Indeed, the control components add to the force necessary to control the valve, and the force necessary can then reach, and even exceed, the limit specified by the standards for a flushing system. The proposed solution also includes other advantages.

WO 94/09217 relates to a method using a complex siphoning that is not fully satisfactory.

PCT/GB 98/03094 discloses a siphoning device with a sized orifice serving as a vent, the latter being located at the bottom of a small reservoir. In case of a fault-free operation, the vent is always submerged in water, thus permitting the siphoning and simultaneously the opening of the float valve.

In case of a small leak, the volume of water in which the vent is submerged has the time to be sucked through the latter, accordingly the vent is finally connected to the atmosphere and the siphoning cannot occur. The float housing remains full, and therefore the float valve remains closed and secure.

With regard to resetting, the prior art provides either a direct emptying device being located at the base of the float housing, which presents risks in case of leakage, or a retractable mechanism that should be maintained in a high position for the period of a filling of the main reservoir of the cistern until the closing of the float valve, to obtain a resetting.

U.S. Pat. No. 5,862,537 discloses a siphoning device by suction obtained during a flushing, the spontaneous drop of water in the main water reservoir creating a negative pressure across the valve.

The detection of the small leak is thus obtained because during a slow drop of the water level in the main reservoir of the toilet flushing system, there is no negative pressure on the upper portion of the siphon. Thus, the water level in the float housing and the closing of the float valve are maintained.

The resetting is obtained through a mechanically operating auxiliary system, which is actuated through a control lever of the valve.

However, this solution also presents risks. When the siphon remains in the siphoning position, such as an accidental blocking of the control lever, it is impossible to detect a large leak. It is even more difficult to detect a small leak.

BRIEF SUMMARY OF THE INVENTION

The present invention addresses at least part of these drawbacks and provides a solution for resetting the float valve with a single maneuver, while guaranteeing an anti-siphoning so as to maintain the float valve in the closed position in case of a leak. The safety is perfectly positive, such that any blocking of the device results in maintaining the float valve closed.

The device controls the filling of a cistern in a toilet flushing system. The device is in the main reservoir of the toilet flushing system, and the water inlet of the main reservoir is controlled by a valve. The valve has an opened configuration and a closed configuration, controlled by float in a float housing within the main reservoir. The float is movable between a first position, being high in the float housing and a second position, being low in the float housing. The valve is in the closed configuration when the float is in the first position with the float housing full of water. The valve is in the opened configuration, when the float is in the second position with the float housing empty. The float housing is in fluid connection to the main reservoir by a siphon being comprised of a suction tube connected to the float housing and a discharge tube connected to the main reservoir. The discharge tube ends in an auxiliary reservoir that is in fluid connection with the main reservoir. A passage connects the suction tube and the discharge tube together at the level of their upper ends. The passage is located above the maximum filling level of the float housing. The device includes a controller or control mechanism movable from an initial position to an actuated position. The shift from the initial position to the actuated position results in an overpressure in the siphon. The shift from the actuated position to the initial position results in a negative pressure in the siphon. The succession of the overpressure and the negative pressure results in a flow of water from the suction tube to the discharge tube so as to overflow the auxiliary reservoir and to empty the float housing. The controller can be comprised of a means for priming the siphon.

According to a preferred embodiment, the discharge tube extends vertically and has a lower end below the maximum water level of the auxiliary reservoir.

Advantageously, the means for priming comprise a means for actuating the controller between the actuated position and the initial position.

According to another embodiment, the passage has a sized cross-section smaller than the cross-section of the water columns, the suction tube, or the discharge tube.

Preferably, the means for actuating the controller is a bellows or a restoring spring arranged in a small pump.

According to a particular embodiment, a compartment is arranged between the siphon and the controller. The compartment is comprised of a connecting hole at the level of the passage. The compartment is in fluid connection with the siphon through the connecting hole.

According to an advantageous embodiment, a compartment is arranged between the siphon and the controller. The compartment is comprised of an offset connecting hole. The offset connection hole is arranged on the discharge tube under the passage, so as to provide a volume of air in the upper portion of the siphon above the offset connecting hole when the main reservoir is full.

Preferably, the device includes a secondary siphon in the form of a bell extending from the top of the compartment to below the offset connecting hole between the compartment and the siphon.

Advantageously, the device includes an anti-siphoning bell arranged on a bottom of the float housing and in fluid connection to the suction tube so as to provide a volume of air in the event of a small flush, and an auxiliary siphon arranged for transferring the volume of air to the suction tube during the rise of the water in the main reservoir.

With these arrangements, the valve can be in the opened configuration only upon a deliberate action on the control mechanism or controller, which causes the means for actuating to react. A positive security is thus obtained, guaranteeing the closed configuration of the valve without a deliberate action by a user, irrespective of a possible leak at any component of the toilet flushing system.

There are other features of the invention.

The passage may have a sized cross-section smaller than the cross-sections of either the suction tube or the discharge tube. The smaller cross-section slows down the siphoning, and delays the valve reaching the opened configuration.

The means for priming the siphon can be comprised of a means for actuating the controller. The means for actuating the controller maybe springy to restore the controller from the actuated position back to the initial position. The means for actuating may be a bellows or a spring arranged in a small pump. The bellows and the spring are two simple and robust solutions for the implementation of the invention.

A compartment may be arranged between the siphon and the controller. In one embodiment, the compartment has a connecting hole in fluid connection with the siphon and a tube connected to the controller.

The connecting hole is a connection arranged at the level of the passage, thus providing the best reliability due to fluid connection at the highest point of the siphon.

Alternatively, the compartment between the siphon and the controller can be an offset connecting hole arranged at the level of the discharge tube and under the passage. The offset connecting hole provides a volume of air in the upper portion of the siphon above the offset connecting hole when the main reservoir is full. This arrangement permits a more compact installation, The device can include a secondary siphon being comprised of a bell extending from the top of the compartment to below the offset connecting hole as the connection between the compartment and the siphon. The bell improves the reliability with respect to small leaks.

The controller or control mechanism can be mounted directly on a control rod of the valve. Alternatively, the controller can have a control button to remain pressed when the valve is in the opened configuration. The control button also maintains the valve in the closed configuration, and allows detection of large leaks.

The advantage provided by the present invention is increased security against leakage for a toiler flushing system, with an improved guarantee not to open the water inlet of the valve in case of a leak.

The float is released only upon release of the control button. Thus, during an accidental blocking of the control knob, the valve is kept in the closed configuration. The closed configuration avoids a great waste of water due to the valve being maintained in the open position.

The present invention will be better understood when reading the following detailed description with reference to the attached figures.

DETAILED DESCRIPTION OF THE INVENTION

Figure 1:
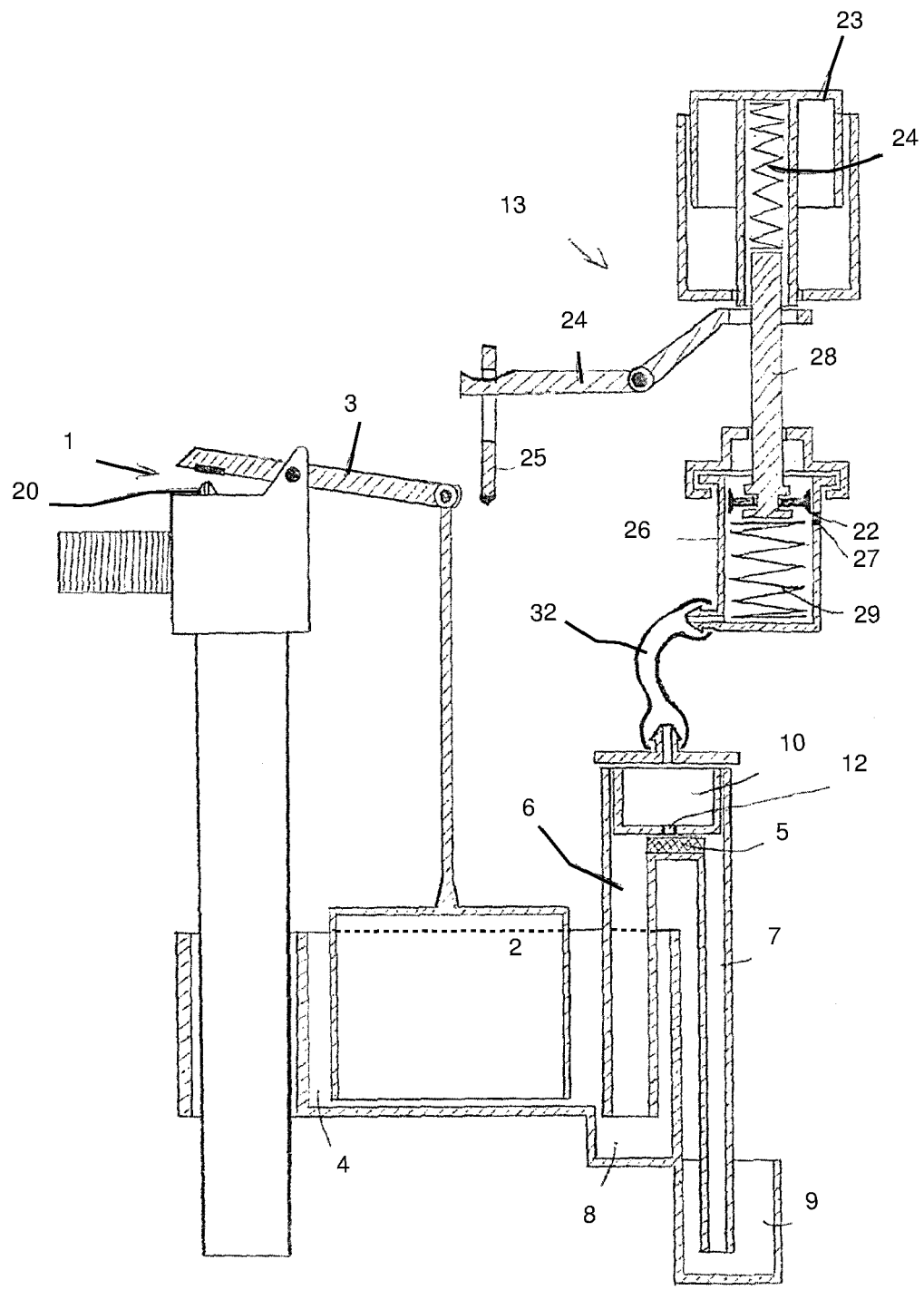
FIG. 1 is a schematic view of a first embodiment of the device for a toilet flushing system according to the invention.
Figure 2:
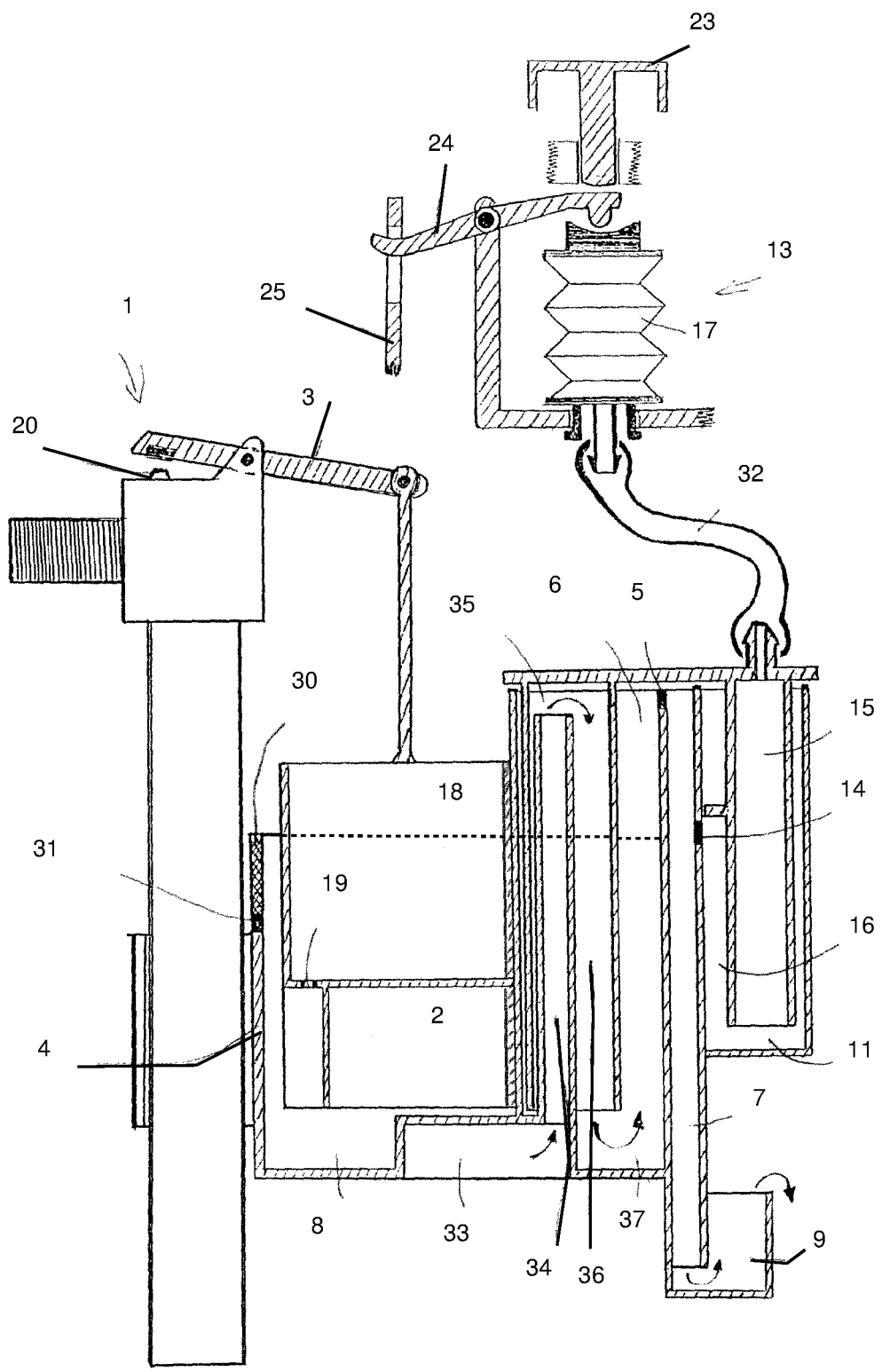
FIG. 2 is a schematic view of a second embodiment of the same device according to the invention.

As illustrated in FIGS. 1 and 2, the toilet flushing system comprises a cistern and a main reservoir. A valve 1 with a water inlet in fluid connection with the main reservoir is actuated between an opened configuration and a closed configuration by a float 2 in a float housing 4. The float 2 is movable between a first position, being high and near the top of the float housing 4, and a second position, being low and near the bottom of the float housing 4. The float 2 is movable by a lever 3. When the float housing 4 is emptying, the float 2 descends in the float housing 4, which opens the valve 1. In order to obtain the emptying of the float housing 4, the controller or control device includes a siphon formed of a passage 5 between the upper ends of a suction tube 6 and a discharge tube 7. The internal column formed by the suction tube 6 ends with its lower end in the float housing 4.

According to a preferred embodiment, the device empties the float housing 4 as complete as possible. A base 8 is provided in the bottom of the float housing 4, and the lower end of the suction tube 6 ends at the bottom of the float housing 4. The base 8 forms a set-back extending under the bottom of the float housing 4. The discharge tube 7 ends with its lower end in an auxiliary reservoir 9 located outside the float housing 4 and at a level lower than the lower end of the suction tube 6. In the case of priming with the siphon, the water flows from the suction tube 6 to the discharge tube 7, thus emptying the float housing 4.

When actuating the cistern, the water level in the main reservoir drops quickly, and the discharge tube 7 is just submerged with its base in the auxiliary reservoir 9. Then, when releasing the control button, the two water columns in the suction tube 6 and discharge tube 7 join each other at the level of the passage 5, which triggers the siphoning of the float housing 4. Following the drop of the float 2, the valve 1 is in the opened configuration, and hence the main reservoir is filled, including refilling the float housing 4 again. When the float housing 4 is completely or at least partially submersed, the float 2 rises in the float housing to move the valve 1 to the closed configuration.

However, in case of a small leak, the water can flow out from the main reservoir, and the water level in the main reservoir slowly drains to the bottom of the discharge tube 7 and the auxiliary reservoir 9. The valve 1 will move the opened configuration. In order to avoid the valve 1 in the opened configuration because of a small leak, the present invention prevents the siphon from starting and getting into action. To this end, according to the invention, a compartment 10, which is connected to the atmosphere through a hole for connecting to the atmosphere 27, is arranged in connection with the upper portion of the siphon, so as to prevent the siphon from priming and from getting into action. The drop in level of the water in the main reservoir, and hence in the discharge tube 7, then has no effect on the suction tube 6, the water level in the suction tube 6 thus remains unchanged and the siphon does not start.

According to another embodiment, a compartment 11 is arranged in connection with the upper portion of the siphon through an offset connecting hole 14 so that the upper portion of the suction tube 6 and discharge tube 7, located above the level of the offset connecting hole 14, remains full of air, even in case of leakage at the controller or control device. The drop in level of the water in the main reservoir and thus in the discharge tube 7 is then not enough to cause the water level to raise in the suction tube 6 to the passage 5, and the siphon does not start.

Two exemplary embodiments of such a compartment 10, 11 are described below.

In the first exemplary embodiment, shown in FIG. 1, the device includes a compartment 10 arranged above the passage 5, with a connecting hole 12. The compartment 10, in connection with the hole for connecting to the atmosphere 27, prevents siphoning. The compartment 10 accommodates a sufficient amount of water to permit the siphon, once it the siphon has started, to completely empty the float housing 4. During suction by the controller, the compartment contains the sufficient amount of water.

The inner volume of said compartment 10 may be subjected to a negative pressure.

In order to obtain the siphoning, and therefore the opening the valve 1 for filling the main reservoir, a controller or control mechanism 13 permits a thrust to inject air through the compartment 10 and to expel the air and the water contained in the discharge tube 7 in a first stage. Then, in a second stage, a reverse movement sucks water from the auxiliary reservoir 9 into and along the discharge tube 7 and the water from the float housing 4 into and along the suction tube 6, until at least one of the two columns of water reaches the passage 5. As the two columns in the suction tube 6 and the discharge tube 7 are completely filled with water, as well as the passage 5, and hence join each other, the siphon is primed and empties then the float housing 4. The control mechanism 13 will be described a little later.

The arrangement of the compartment 10 does not permit a complete immersion, and since the device is connected to the atmosphere at the first stage and the second stage. An inadvertent siphoning in case of a small leak at the valve or at the plug of the main reservoir of the cistern is prevented.

According to a second exemplary embodiment of the compartment, shown in FIG. 2, the compartment 11 is arranged on the side of the passage 5 and the upper portion of the discharge tube 7. The suction generated in the suction tube 6 and the discharge tube 7 is then shifted, as can be seen in FIG. 2. An offset connecting hole 14 establishes the connection between the upper portion of the discharge tube 7 and the compartment 11. The compartment 11 accommodates at least part of the water sucked during suction and prevents water from raising in a tube 32. This embodiment operates safely, even with leakage at the controller, control device, or control mechanism 13.

It should be noted that this tube 32 serves as a flow channel during operations of sucking and discharging air and/or water in the device according to the invention. The tube 32 is connected at its upper end to the trigger mechanism, namely, another component of the control mechanism 13.

The tube 32 may have a larger diameter, capable of containing the amount of water sucked during suction. At least part of volume of the tube 32 would be connected to the volume of the corresponding compartment 10, 11 so that the total volume would contain the water sucked during suction. This embodiment has however the drawback that bigger tubes are more difficult to install in the toilet flushing system. Tube 32 are usually selected to be as compact as possible.

In the embodiment of FIG. 2, an offset of the suction associated with the compartment 11 maintains a sufficient volume of air, such as an air pocket, to prevent siphoning in case of a small air leak in the control device 13 and a slow drop of the water level in the main reservoir. The compartment simultaneously maintains sufficient volume to submerge the whole siphon for siphoning according to the controller 13.

The "air pocket" effect is similar to that obtained by an extension of the two suction 6 and discharge 7 tubes. FIG. 2 also shows the top of the siphon, where the two columns of the suction tube 6 and the discharge tube 7 join each other, is sufficiently high and out of the water relative to the water level in the main reservoir, during the closing of the valve 1. A sufficient volume of air remains in the siphon so as not to initiate a siphoning in case of a small leak and a slow drop of the level of water in the main reservoir.

According to a preferred embodiment, the control means or mechanism may be comprised of a bellows 17.

Alternatively, the bellows 17 may be replaced by a small pump 26 with or without a hole for connecting to the atmosphere 27.

Irrespective of the embodiment, the cross-section of the suction tube 6 may preferably be larger than the cross-section of the discharge tube 7, which reduces the size of the entire device.

To further improve the reliability of the device, namely in case of leakage at the control mechanism 13, a bell 15 is arranged in the compartment 11. Following a leak at the control mechanism 13 with the compartment 11 partially filled, and with the level of water in the compartment 11 still being above the offset connecting hole 14, and during a water leak at the level of the valve in the bottom of the main reservoir, the water level in the main reservoir drops slowly. The water level in the main reservoir gradually releases water from the discharge tube 7, which causes the drop of the air in the discharge tube 7 and the rise of the water and air in the suction tube 6, since the water level in the float housing 4 remains unchanged. When the air in the discharge tube 7 arrives at the level of the offset connecting hole 14, the air would pass through this offset connecting hole 14 and rise in the compartment 11, and the air would be replaced by water, which would permit the discharge tube 7, as if there would not have been air, to cause the water to rise along and in the suction tube 6, finally causing a siphoning. However, the bell 15 forms a secondary siphon 16 to prevent the dropping air in the discharge tube 7 from rising in the compartment 11 and being replaced by water during the drop of the level of the water column in the discharge tube 7. The secondary siphon 16 has thus a locking function. The offset connecting hole 14 as the "passage" between the secondary siphon 16 and the discharge tube 7 will not siphon from the bell 15, until overpressure and negative pressure by the control mechanism 13. The bell 15 recovers the air-water mixture upon release of the control means, i.e. the bellows 17. The bell 15 is dimensioned so that the water does not rise to the top and cannot enter into the tube 32 connecting the bell 15 to the bellows 17 or to the small pump 26.

According to the embodiment shown in FIG. 2, the float 2 is topped by a ballast reservoir 18. The water levels in the main reservoir as well as in the ballast reservoir 18 drop simultaneously. The emptying of the ballast reservoir 18 occurs through a sized orifice 19, which permits to maintain the float 2 in the first position high in the float housing 4, and thus the valve 1 in the closed configuration, the lever 3 pressing on the exhaust hole 20 of a hydraulic valve.

Hereafter are described two examples of controllers, control means, control mechanism or control devices 13 suitable for the present invention. Any control devices can be used for any of the solutions of compartment 10 above the passage 5 or solutions of compartment 11 next to the upper portion of the discharge tube 7, with or without bell 15.

According to an embodiment of the controller, control means, control mechanism, or control device 13, shown in FIG. 2, for flushing the toilet flushing system, a control button 23 is pressed. A control lever 24 causes the valve on the bottom of the main reservoir to rise, through a control rod 25, and therefore permits the water in the main reservoir to flow. At the same time, the bellows 17 of the control means or controller is compressed, passing the controller from an initial position to an actuated position. The volume of air of the bellows 17 is sufficiently large to inject an amount of air at a pressure sufficient to expel part of the air at the base of the suction tube 6, since the base of the discharge tube 7 is located lower. Upon release of the control button 23, releasing simultaneously the bellows 17, the controller relaxes and returns to the initial position, sucking water through the suction 6 and discharge tubes 7. This water causes the water level to rise to the passage 5, so as to siphon and empty the float housing 4.

After each flushing, and emptying of the float housing after siphoning, the two water columns in the suction tube 6 and discharge tube 7 drop after having sucked air through the suction tube 6 for a reset.

The reset is generally obtained for large toilet flushes using a larger volume of water and which permits a reset, which could thus be satisfactory for the leak detection.

The reset is however necessary for small toilet flushes, because without reset, the siphon continues to empty the float housing 4. During filling of the main reservoir the float 2 still rises with the water level in the main reservoir, and the valve 1 still shuts off the water inlet in the closed configuration, but the two water columns in the suction tube 6 and the discharge tube 7 of the siphon have not reached the right level of adjustment. The level of water in the main reservoir and the overflow of water from the main reservoir into the float housing 4 sets the valve 1 in the closed configuration before the siphon is ready. The siphon continued to drain the float housing 4, even when the flush was completed.

FIG. 2 shows the embodiment with the anti-siphoning bell 33 located just out of the water during the small toilet flush, and shows the air replacing the water that was present there. At the same time, the water level in the float housing 4 drops, the passage 5 must stop the drop of the water level in the float housing 4, in order to delay opening of the valve 1. During the opening of the valve 1 for a small toilet flush, the water level in the main reservoir rises, and the water enters into the anti-siphoning bell 33, discharging the air through the chimney 34 to the return bell 35. Since the pressure is increasing in the anti-siphoning bell 33, due to the rise of the level in the main reservoir and decreasing on the side of the float housing 4 where the water level continues to drop, the pressure is sufficient to permit the air to drop in the column 36 to an anti-siphoning connection 37 and to rise in the suction tube 6, thus creating an air pocket as for a reset. The anti-siphoning bell 33 stops the siphoning to empty the float housing 4 would normally stop the siphoning in a large toilet flush. It should be noted that this connection 37 ends into the float housing 4.

This air pocket is sufficient to guarantee the anti-siphoning toward the float housing 4, thus permitting to obtain, after each small toilet flush, the proper level of filling of the main reservoir. The water level in the main reservoir rises and fills the float housing 4 by overflow.

At the same time, the anti-siphoning is guaranteed thanks to the air pocket in the case of a small leak and a slow drop of the water level in the main reservoir providing in addition a supplement of air after a reset.

According to another embodiment of the controller, control means, control mechanism, or control device 13, shown in FIG. 1, for flushing the toilet flushing system, the control button 23 is pressed. A control lever 24 causes the valve at the bottom of the main reservoir to rise through a control rod 25, and water from the main reservoir to flows out of the main reservoir. At the same time, the spring 21, by compressing, causes the axis 28 of the small pump 26 of the control means to descend. The rubber seal 22 descends while compressing a restoring spring 29. The air volume of the small pump is enough to inject a sufficient amount of air to expel part of the air at the base of the suction tube 6, since the base of the discharge tube 7 is located lower. Upon release of the control button 23, releasing at the same time the spring 21, the restoring spring 29 causes the axis of the small pump 26 to rise with the rubber seal 22 integral with the restoring spring, thereby sucking the water through the suction tube 6 and discharge tube 7. The water level rises to the passage 5, so as to siphon and empty the float housing 4.

While siphoning, the water then partly fills the compartment 10, until the seal 22 releases the hole for connecting to the atmosphere 27 so as to connect the entire siphoning device to the atmosphere.

The connecting hole 12 is sized so that the siphoning of the float housing 4 releases water from the suction tube 6 and the discharge tube 7 over an entire height the float 2 in the float housing 4. The float is capable of dropping after the suction tube 6 and the discharge tube 7 have started to suck air.

After the connection to atmosphere of the siphoning device, since the air can penetrate through the hole for connecting to the atmosphere 27, the compartment 10 empties after the necessary time, permitting the siphoning of the float housing 4. The device is thus capable of detecting the small leak, since the siphoning cannot occur without actuating the control mechanism 13, the siphon being comprised of the passage 5, suction tube 6, and discharge tube 7 being connected to the atmosphere through the hole for connecting to the atmosphere 27 and the connecting hole 12.

During a reset after a leak, the auxiliary reservoir 9 permits siphoning, and instead of air bubbles escaping at the base of the suction tube 6, they escape at the base of the discharge tube 7, since the immersion of the discharge tube 7 is less than the suction tube 6 in the float housing 4, the main reservoir of the toilet flushing system being empty due to said leak.

The float housing 4 is then filled right to the brim, as well as the auxiliary reservoir 9. To reset the valve 1, it is enough to actuate the bellows 17 or the small pump 26 by pressing the control button 23, which expels air through the discharge tube 7, since the main reservoir of the cistern is empty. Then, by releasing the control button 23, the water in the suction tube 6 and discharge tube 7 rises and results in the discharge tube 7 being longer (out of the water). The water column contained in the discharge tube 7 will be enough by rising to start the siphoning. The siphon empties the float housing 4 to cause the opening of the valve 1.

The valve 1 is, after each filling of the main reservoir in the closed position, secure, and only a maneuver of the control mechanism 13 can open the valve 1. The valve 1 is reset at each maneuver, the opening of the valve 1 occurring only during the release of the button. Here too, a positive safety is obtained, according to which the valve 1 is held in the closed position in case of an accidental blocking of the control button.

This device for resetting and restarting the valve permits a reset at each maneuver, each time connecting the device to the atmosphere.

According to a preferred embodiment of the invention, the passage 5 is sized so as to obtain a slowed down flow through the suction tube 6 and discharge tube 7, and thus a delayed opening of the valve 1. This delayed opening avoids filling the main reservoir as long as the valve is not closed, and thus to properly controls the amount of water to be used with each flushing.

The sized passage 5 determines the delay for opening, the valve 1 opening normally just after the closing of the valve on the bottom of the main reservoir.

Both embodiments of the resetting device can be used independently from the control of the valve, for the case of an autonomous valve float using the ballast reservoir. The reset device, using the control means in the form of bellows or a small pump, is then mounted on the hole of the main reservoir remaining free. The reset device serving just as a reset in case of putting the float valve in a safety mode following the detection of a leak.

Another exemplary embodiment consists in using control means in the form of a small pump provided with non-return valves operating as a priming pump. The siphon is provided to suck and to partially empty the float housing, thus causing water level to drop, and hence the float therein, so as to trigger the opening of the float valve.

A delayed opening of the valve 1 can also be obtained by arranging sockets 30 above the side walls of the float housing 4 and a sized orifice 31 at the level of the initial height of the float housing 4. The emptying of the float housing 4 is thus delayed and the delayed opening of the valve 1 is thus obtained.

According to the various embodiments of the invention, the following advantages are obtained:

the opening of the float valve 1 by siphoning of the float housing 4 during the flushing of the cistern,
the delay in opening of the float valve 1 through the sized passage 5 between the suction tube 6 and discharge tube 7,
the closing and making safe of the float valve 1 after each flushing of the cistern and filling of the main reservoir,
the anti-siphoning in case of a small leak at the valve, so as to detect the leak,
the detection of the small leak in case of a small leak at the valve,
maintaining the float valve 1 closed in case of an accidental blocking of the control button 23 (corresponding to a large leak),
the closing of the valve 1 in case of an accidental blocking of the valve in the high or open position (corresponding to a large leak),
the detection of the large leak, irrespective of the blocking height of the valve,
the resetting of the float valve 1 following a leak detection, and its putting in safety.

NOMENCLATURE 1. valve
2. float
3. lever
4. float housing
5. passage
6. suction tube
7. discharge tube
8. base
9. auxiliary reservoir
10. compartment
11. compartment
12. connecting hole
13. control mechanism
14. offset connecting hole
15. bell
16. secondary siphon
17. bellows
18. ballast reservoir
19. sized orifice
20. exhaust hole
21. spring
22. seal
23. push-button
24. control lever
25. control rod
26. small pump
27. hole for connecting to the atmosphere
28. axis
29. restoring spring 30. socket
31. sized orifice
32. tube
33. anti-siphoning bell
34. chimney
35. return bell
36. column
37. anti-siphoning link

I claim:

1. A device for controlling filling of a cistern to be installed in a main reservoir of a toilet flushing system, the device comprising:
   a valve being in fluid connection to a main reservoir and having a water inlet, said valve having an opened configuration and a closed configuration;
   a float housing within said main reservoir;
   a float being connected to said valve and being positioned within said float housing, said float having a first position at a top of said float housing and a second position at a bottom of said float housing,
   wherein said first position of said float corresponds to said closed configuration of said valve, and
   wherein said second position of said float corresponds to said opened configuration of said valve;
   a siphon in fluid connection with said float housing, said siphon being comprised of:
      a suction tube in fluid connection with said float housing;
      a passage in fluid connection with said suction tube, said passage being positioned above said top of said float housing; and
      a discharge tube in fluid connection with said passage and said main reservoir through an auxiliary reservoir, said auxiliary reservoir being housed within said main reservoir, said discharge tube have one end connected to said passage and another end connected to said auxiliary reservoir; and
   a controller being in fluid communication with said siphon, having an initial position and an actuated position and being comprised of a means for priming said siphon,
   wherein shifting from said initial position to said actuated position corresponds to an overpressure in said siphon,
   wherein shifting from said actuated position to said initial position results in a negative pressure in said siphon, and
   wherein a succession of said overpressure and said negative pressure in said siphon by said controller corresponds to a flow of water from said suction tube to said discharge tube so as to overflow said auxiliary reservoir and empty said float housing,
   after an injection of air sufficient to expel air from said siphon at a base of at least of a group consisting of said suction tube and said discharge tube.

2. The device, according to claim 1, wherein said discharge tube extends vertically and has a lower end below a maximum water level of said auxiliary reservoir.

3. The device, according to claim 1, wherein said means for priming comprises a means for actuating said controller from said actuated position to said initial position.

4. The device, according to claim 3, wherein said means for actuating said controller is comprised of a bellows.

5. The device, according to claim 3, wherein said means for actuating is comprised of a spring arranged in a pump.

6. The device, according to claim 1, further comprising: a compartment arranged between said siphon and said controller, said compartment being comprised of a connecting hole at a level of said passage, said connecting hole being in fluid connection with said siphon.

7. The device, according to claim 1, further comprising: a compartment arranged between said siphon and said controller, said compartment being comprised of an offset connecting hole arranged on said discharge tube under said passage, said offset connecting hole being in fluid communication with said siphon so as to provide a volume of air in an upper portion of said siphon above said offset connecting hole when the main reservoir is full.

8. The device, according to claim 7, further comprising:
   a secondary siphon being comprised of a bell extending from a top of said compartment to below said offset connecting hole.

9. The device, according to claim 7, further comprising:
   an anti-siphon bell arranged on a bottom of said float housing and in fluid connection to said suction tube so as to provide another injection of air to said suction tube of said siphon; and
   an auxiliary siphon being comprised of a chimney, a return bell, a column, and an anti-siphoning link and being arranged in fluid connection at a bottom of said suction tube, said another injection of air corresponding to rising water in said main reservoir.

\* \* \* \* \*